United States Patent
Zhai et al.

(10) Patent No.: US 7,894,685 B2
(45) Date of Patent: Feb. 22, 2011

(54) METHOD AND APPARATUS FOR REDUCING RINGING ARTIFACTS

(75) Inventors: Fan Zhai, Richardson, TX (US); Weider P. Chang, Hurst, TX (US); Hsindao E. Lu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/495,370

(22) Filed: Jun. 30, 2009

(65) Prior Publication Data

US 2010/0002951 A1    Jan. 7, 2010

Related U.S. Application Data

(60) Provisional application No. 61/077,254, filed on Jul. 1, 2008.

(51) Int. Cl.
*G06K 9/40* (2006.01)
*H04N 7/26* (2006.01)

(52) U.S. Cl. .................. 382/266; 382/275; 375/240.26

(58) Field of Classification Search .............. 382/266, 382/275; 375/240.26
See application file for complete search history.

(56) References Cited

U.S. PATENT DOCUMENTS

| | | | |
|---|---|---|---|
| 5,920,356 A | 7/1999 | Gupta et al. | |
| 6,731,823 B1 * | 5/2004 | Gallagher et al. | 382/266 |
| 6,804,408 B1 * | 10/2004 | Gallagher et al. | 382/272 |
| 6,845,180 B2 | 1/2005 | Matthews | |
| 7,003,173 B2 | 2/2006 | Deshpande | |
| 7,031,546 B2 | 4/2006 | Maeda et al. | |
| 7,031,552 B2 | 4/2006 | Kim | |
| 7,551,792 B2 * | 6/2009 | Kong et al. | 382/260 |
| 7,657,098 B2 * | 2/2010 | Lin et al. | 382/199 |
| 7,680,355 B2 * | 3/2010 | Chiu et al. | 382/266 |

OTHER PUBLICATIONS

Y. Nie, et al., "Fast Adaptive Fuzzy Post-Filtering for Coding Artifacts Removal in Interfaced Video", IEEE ICASSP 2005, Cambridge, Massachusetts.

* cited by examiner

*Primary Examiner*—Bhavesh M Mehta
*Assistant Examiner*—Stephen R Koziol
(74) *Attorney, Agent, or Firm*—Mirna Abyad; Wade J. Brady, III; Frederick J. Telecky, Jr.

(57) ABSTRACT

A method and apparatus for ringing artifacts reduction for compressed video signals. The method includes receiving luma data to the digital signal processor, calculating sum of gradient of the luma data; calculating SAD of the luma data; performing pixel classification based of the calculated SAD and sum of gradient, performing erosion on a detected edge pixel indicator on a detected flat pixel indicators, determining at least one of the strength or weakness of the an edge based on the determined edge erosion, performing horizontal dilation on the detected edge pixel indicators and edge strength; and performing at least one of sigma or bilateral filtering to the luma data according to the detected edge pixel indicator, flat pixel indicator, edge strength, the number of very flat pixel in the block.

9 Claims, 8 Drawing Sheets

METHOD AND APPARATUS FOR REDUCING RINGING ARTIFACTS

CROSS-REFERENCE TO RELATED APPLICATIONS

This application claims benefit of U.S. provisional patent application Ser. No. 61/077,254, filed Jul. 1, 2008, which is herein incorporated by reference.

BACKGROUND OF THE INVENTION

1. Field of the Invention

Embodiments of the present invention generally relate to a method and apparatus for reducing ringing artifacts.

2. Description of the Related Art

Ringing artifacts reduction techniques can usually be classified into two categories: transform domain methods and spatial domain methods. Transform domain methods are usually more accurate. However, in some cases, transform coefficients may not be available, e.g., for blocks after video decoding, in which the transform coefficients are already lost. For this case, we have to detect ringing artifacts on the spatial domain. On the other hand, transform domain methods are usually more complicated. Below we briefly describe some related work in these two categories.

In the current image and video compression standards, such as JPEG for image and MPEG and H.26x for video, signals are usually divided into fixed-size blocks (usually 8×8), transformed, quantized, followed by an entropy coding of the transform coefficients. Coarser quantization stepsize is usually used for high frequency coefficients, in order to achieve compression gain (saving bits) but ringing artifacts can be introduced if the signal being transformed has hard transitions, as shown in the example of FIG. 1. Therefore, to work directly on the transform coefficients, i.e., to perform detection in the transform domain, is usually the most straightforward and efficient method to detect ringing artifacts.

As discussed above, spatial domain methods do not rely on the MPEG coding parameters. In this scheme, processing is performed within each 3×3 window and separately in the vertical and horizontal directions. A threshold is used to determine the horizontal and vertical correlations within the 3×3 window, and a 3-tap or 2-tap low-pass filter is then adaptively selected according to the level of the detected spatial correlation. Although this scheme is simple to implement, it is not sufficient to remove ringing artifacts, mainly due to the small size kernel used.

Another method improves the performance of ringing artifacts reduction by making use of the information in a bigger window with size of 15×15. The neighboring pixel difference within each 3×3 window is first calculated. This value is then compared to the maximum difference of neighboring pixels in each 15×15 window to determine if there likely exists an edge within the 3×3 window, or outside the 3×3 window but within the 15×15 window, or there is no edge within the 15×15 window. Nonlinear low-pass filtering is then applied to the pixel, if the there exists an edge within the 15×15 window but there is no edge within the 3×3 window. The scheme can achieve better performance in terms of ringing artifacts reduction, but, like most de-ringing algorithms, it suffers from over smoothing details during ringing artifacts removal.

Other methods are intended to overcome this by combining de-ringing and edge sharpening filters into a single filter. In this method, each pixel is first classified as one of the three types: "Visual non-edge pixel substantially surrounded by visual non-edge pixels", "Visual edge pixels", and "Visual non-edge pixels substantially surrounded by edge pixels". This is achieved by comparing the sum of edge strength in each 3×3 window, which is calculated based on the gradients measurement using the Roberts operators, with some predefined threshold. De-ringing filtering, sharpening filtering, and no processing are performed to those three types of pixels, respectively. De-ringing filtering output is simply the average over the non-edge pixels within the 3×3 window. The sharpening filter is a nonlinear filter, also performed within the 3×3 window. The drawback of this method is, still, over smoothing edges, together with poor quality of removing ringing artifacts. This is because the de-ringing filtering is applied to each 3×3 window, which is usually not large enough since ringing artifacts can spread beyond it.

Another spatial-domain scheme uses a larger window with the size of 5×5. It also makes use of the edge information within a 16×16 MB to guide the low-pass filtering. It performs better performance the above-mentioned methods. However, the algorithm used to detect edge is too simple, which can hardly differentiate between busy details and true edges. In addition, the horizontal and vertical filtering is performed separately, which usually does not perform as well as a non-separate filter.

Some fuzzy filtering utilizes a 5×5 kernel. However, the performance of the fuzzy filter heavily depends on the chosen threshold. In addition, such algorithm tends to smooth picture details due to the simple edge strength detection scheme used.

In other words, ringing artifact in video is caused by compression, which is introduced by the removal of high-frequency information and, thus, appears as oscillations in an image. Thus, there is a need for an improved method and apparatus for reducing ringing artifacts, while preserving picture details.

SUMMARY OF THE INVENTION

Embodiments of the current invention generally relate to a method and apparatus for ringing artifacts reduction for compressed video signals. The method includes receiving luma data to the digital signal processor, calculating sum of gradient of the luma data; calculating SAD of the luma data; performing pixel classification based of the calculated SAD and sum of gradient, performing erosion on a detected edge pixel indicator on a detected flat pixel indicators, determining at least one of the strength or weakness of the an edge based on the determined edge erosion, performing horizontal dilation on the detected edge pixel indicators and edge strength; and performing at least one of sigma or bilateral filtering to the luma data according to the detected edge pixel indicator, flat pixel indicator, edge strength, the number of very flat pixel in the block

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. It should be noted that a computer readable medium is any medium that may be utilized by a computer to read, write, archive, store, access, and/or execute data.

DETAILED DESCRIPTION

Figure 1A:
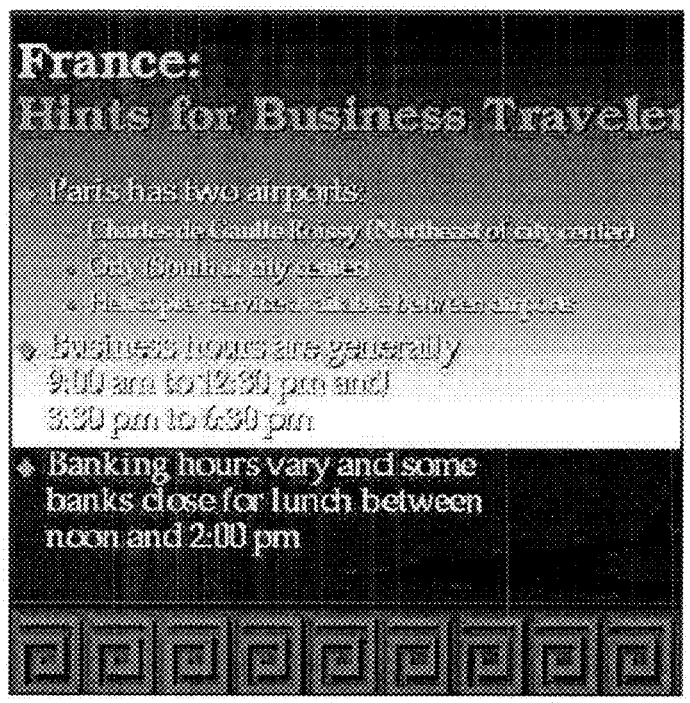
FIG. 1 illustrates an embodiment of hard transitions/strong edges between foreground and background.
Figure 1B:
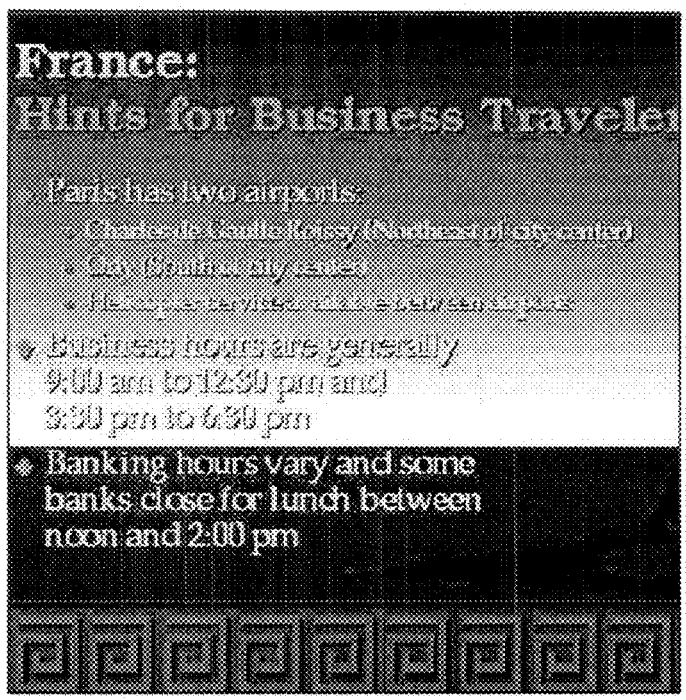
Figure 2A:
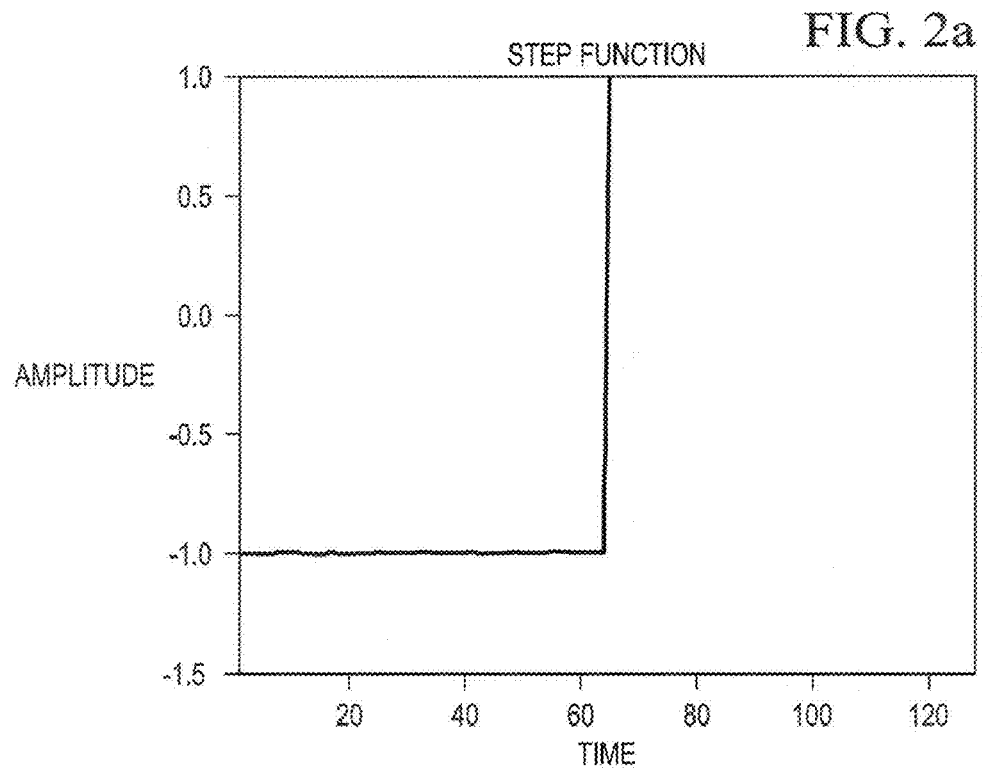
FIG. 2 illustration an embodiment of ringing artifacts. (a) Step function (b) frequency response of the step function (c) step function affected by ideal low-pass filtering (d) frequency response of the step function after ideal low-pass filtering.
Figure 2B:
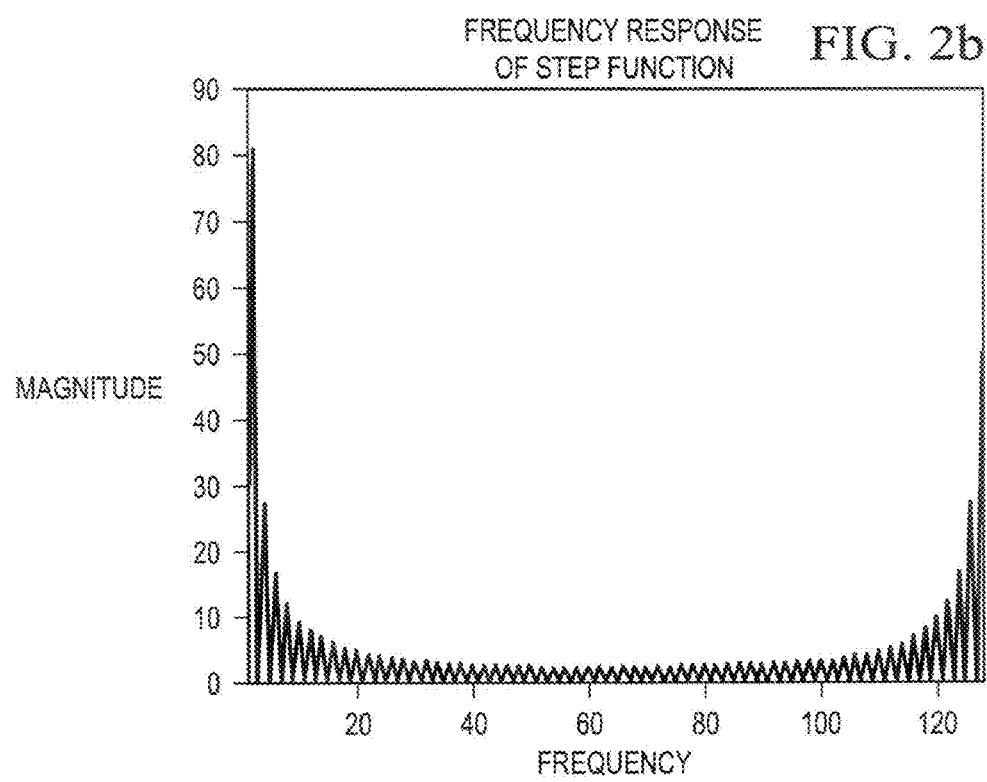
Figure 2C:
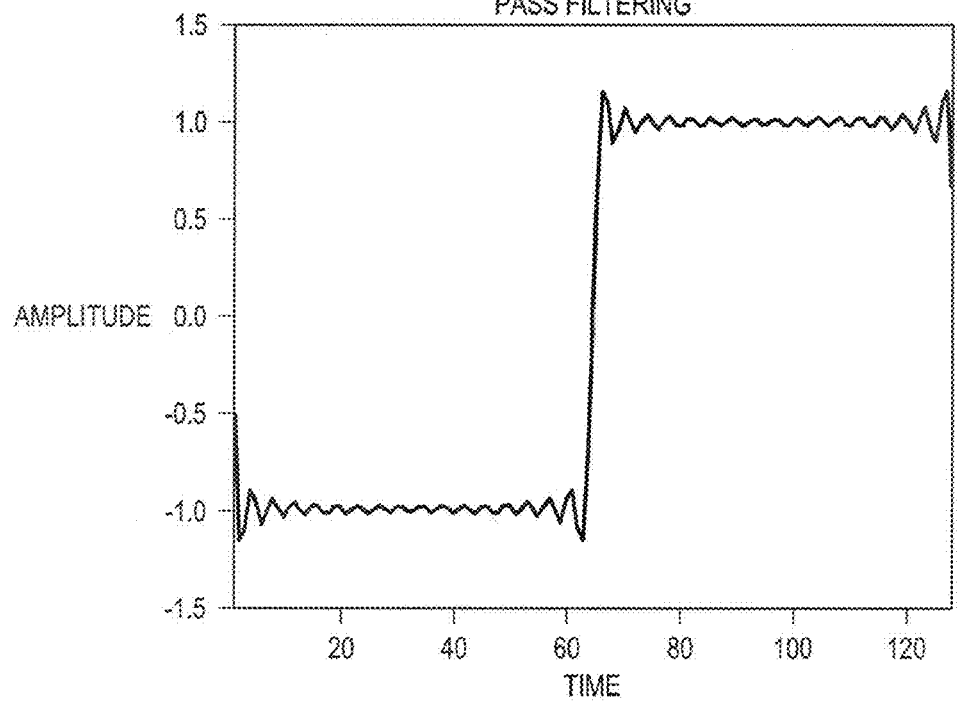
Figure 2D:
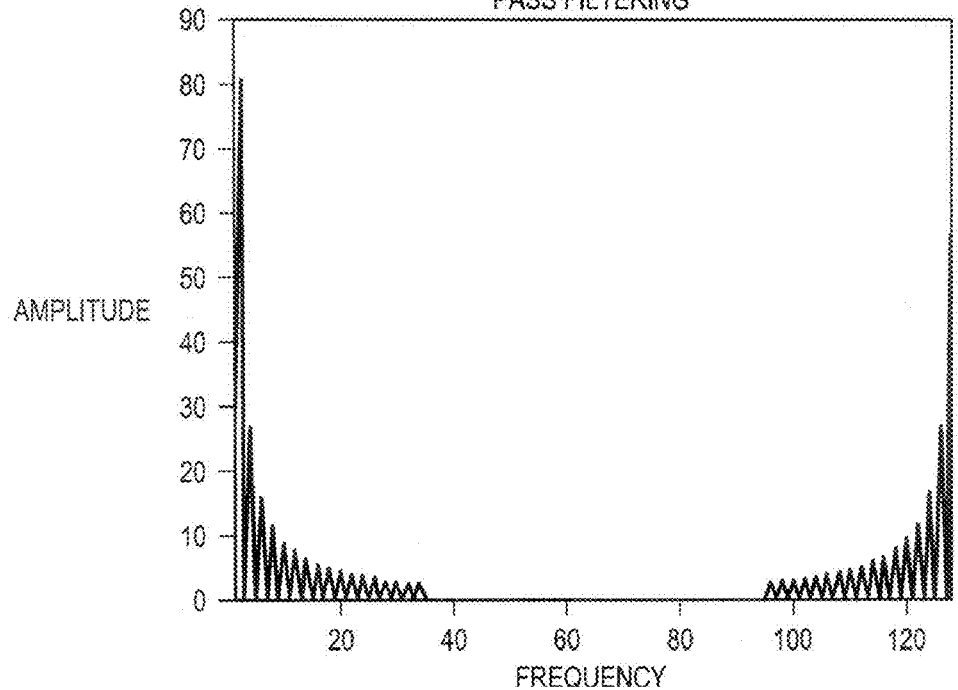

Video compression is a lossy compression, which means some information of the original source will be lost during compression and at the same time, as a result, some artifacts will be generated. Ringing artifact is one of such artifacts caused by compression. It is introduced by the removal of high-frequency information and thus appears as oscillations in an image. It usually happens at hard transitions/strong edges between foreground and background, as shown in FIG. 1.

Hard transition corresponds to high frequency information. A typical example is a step function, which has a plentiful high frequency information. FIGS. 2 (a) and (b) depict a step function and its frequency response, respectively. FIG. 2 (d) shows the frequency response of the output signal after an ideal low-pass filter is applied to the step function. It is clear that, after the ideal low-pass filtering, the high frequency components are set to zero while the other low frequency components are intact. The corresponding output signal in the time domain is shown in FIG. 2 (c), from which we can easily see the resulting ringing artifacts due to the ideal low-pass filtering.

This type of ideal low-pass filtering is very common in image and video compression, due to the coarser quantization used for high frequency coefficients than for the low frequency coefficients in the transform domain. Due to this reason, ringing artifacts are commonly observed in compressed image and video.

Techniques of ringing artifacts reduction usually consist of two stages: detection of the ringing artifacts and the removal of them. Since the removal of ringing artifacts usually appear in the form of low-pass filtering, which tends to smooth texture details, we need to be very cautious to apply low-pass filter to pictures. In other words, there is a need to accurately identify the locations of ringing artifacts and only apply low-pass filtering to such locations.

Figure 3:
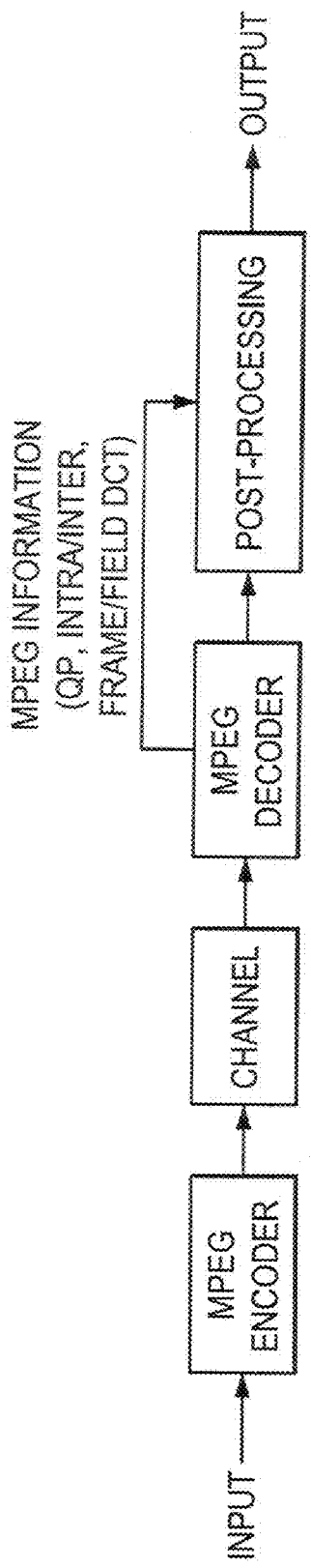
FIG. 3 illustrates an embodiment of a block diagram of a typical video communication system.

In this invention, we propose a method and apparatus to efficiently perform ringing artifacts reduction for compressed images and videos. FIG. 3 shows the block diagram of a typical video communication system. This invention sits in the post-processing block following the MPEG decoder, which means only limited MPEG information may be available in performing ringing artifacts reduction. Generally speaking, the more MPEG information can be used, the better performance of ringing artifacts reduction can be achieved. The scope of this invention is that it is a post-processing technique, so that it can function without relying on MPEG information. If, however, some or part of the MPEG information, such as quantization parameter (QP), the prediction mode (Inter or Intra) of each macroblock (MB), or the coding mode (frame DCT or field DCT) of each MB is available in the post-processing block, better performance can be achieved.

Figure 4:
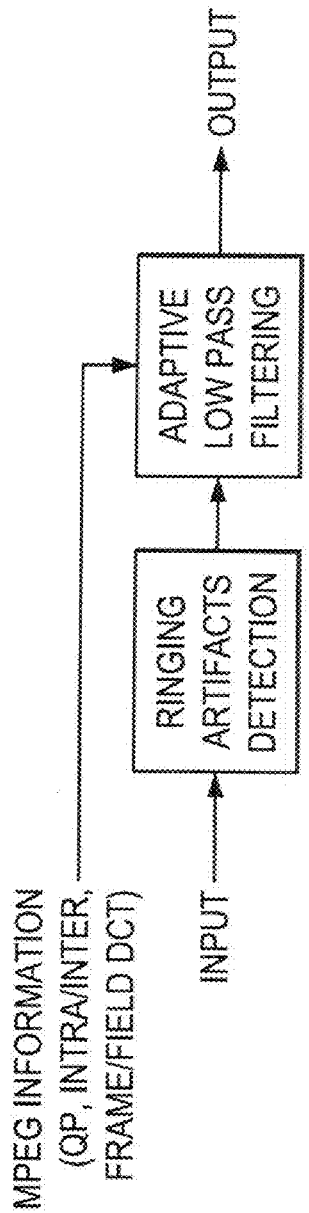
FIG. 4 illustrates an embodiment block diagram of ringing artifacts reduction scheme.

Ringing artifacts reduction schemes are generally performed in two stages, the detection and removal of ringing artifacts, as shown in FIG. 4. Based on the above analysis, the more MPEG information available, in general the better quality can be achieved. In this invention, we generally assume the MPEG information such as QP (quantization parameter), prediction mode (Intra or Inter coding mode), and transformation mode (frame DCT or field DCT) for each MB can be utilized. However, they can be set as some constants in this invention, if they are not available, which still results to decent de-ringing performance, although not as good as when such MPEG information is available.

As discussed in the first section, ringing artifacts are caused by the removal of high frequency DCT coefficients during compression. In the MPEG-2 standards, DCT and the coding of the DCT coefficients are performed per 8×8 block. Thus, the ringing artifacts are usually restricted within each 8×8 block. However, due to the motion compensation, which is performed per 16×16 MB, the ringing artifacts occurred in the reference frame can be propagated to the next frame which relies on this frame as a reference. This can cause ringing artifacts spreading across blocks, which makes the detection of ringing artifacts complicated.

In one embodiment the rule is: if a MB is intra-encoded, then we know that the ringing artifacts should be limited to one 8×8 block, since the DCT and quantization parameters of these four blocks of this MB are independent to each other. If, however, a MB is inter-encoded, we assume that the ringing artifacts can spread across blocks, but are still restricted within the MB.

Figure 5:
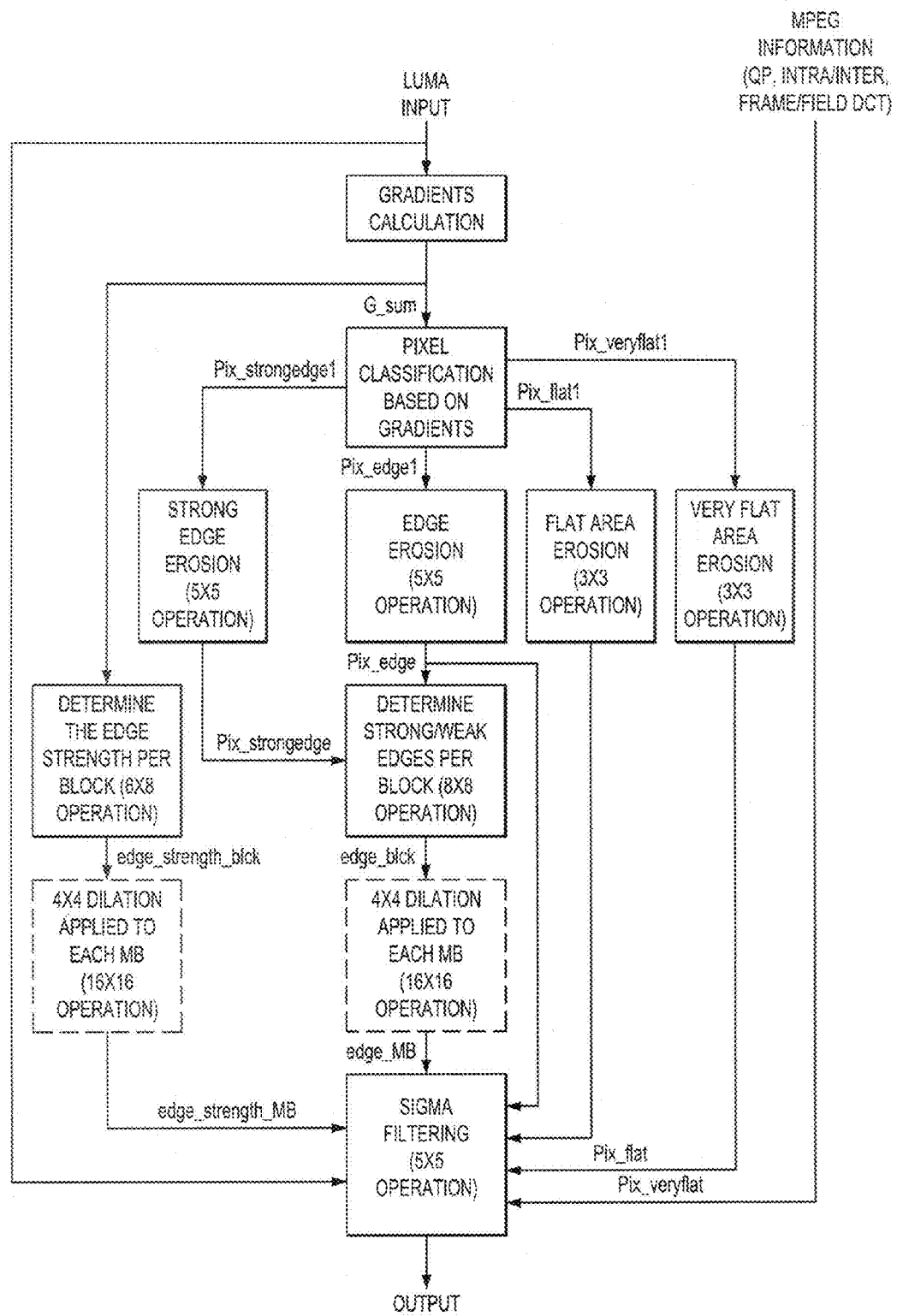
FIG. 5 illustrates an embodiment of top-level block diagram of the proposed ringing artifacts reduction.

As discussed above, ringing artifacts usually occur around strong edges. Thus, the ringing artifacts detection stage in this invention is realized based on the gradient information within each 16×16 MB. Based on the gradient measurement, each pixel is classified as "strong edge", "edge", "flat", "very flat", and the other. In order to be robust to noise, each of these classifications passes some morphological operations such as dilation and erosion. The ringing artifacts removal stage is realized through a 5×5 bilateral filter (also called sigma filter), whose performance heavily depends on the chosen thresholds. The thresholds used in the sigma filter are adaptively selected according to the parameters obtained from the first stage. FIG. 5 illustrates the top-level block diagram of this invention.

Sobel operators are widely used for edge detection due to their simplicity and efficiency. In this invention, we employ them to calculate the gradients. The two Sobel operators, which correspond to the gradients in the vertical and horizontal.

$$V_x = \begin{bmatrix} 1 & 2 & 1 \\ 0 & 0 & 0 \\ -1 & -2 & -1 \end{bmatrix}, V_y = \begin{bmatrix} -1 & 0 & 1 \\ -2 & 0 & 2 \\ -1 & 0 & 1 \end{bmatrix} \quad (3.1)$$

We use the sum of the gradients, calculated as below, to indicate the strength of gradients.

$$G\_sum=((|G_x|+|G_y|)\!\gg\!1), \quad (3.2)$$

where $G_x$ and $G_y$ are, respectively, the outputs when applying the two Sobel operators $V_x$ and $V_y$ on each 3×3 window with the pixel being processed sitting at the center. In addition, the sum of absolute difference (SAD) of the 3×3 window with respect to the center pixel is calculated.

$$SAD = \sum_{j=0}^{2}\sum_{i=0}^{2}|Y[j][i]-Y[1][1]|$$

where Y[1][1] is the center pixel value of the 3×3 window.

Based on the sum of gradients and SAD, we can classify each pixel into five types: very flat area, flat area, edge area, strong edge area, and the rest. The previous four identified types correspond to four variables, Pixel_veryflat1, Pix_flat1, Pix_edge1, and Pix_strongedge1, respectively.

---

//Classify each pixel into four categories using thresholding based on G_sum and SAD:
Pix_strongedge1 = (G_sum >= drn_Thr_Gsum_strongedge) ? 1 : 0;
Pix_edge1 = (G_sum >= drn_Thr_Gsum_weakedge) ? 1 : 0;
Pix_flat1 = (G_sum <= drn_Thr_Gsum_flat) ? 1 : 0;
Pix veryflat1 = (SAD <= drn Thr SAD veryflat) ? 1 : 0;

---

For the three thresholds related to gradient, drn_Thr_Gsum_strongedge>=drn_Thr_Gsum_weakedge>= drn_Thr_Gsum_flat must hold. In the simulations, we set drn_Thr_Gsum_strongedge, drn_Thr_Gsum_weakedge, and drn_Thr_Gsum_flat to 256, 156, and 100 respectively. We set drn_Thr_SAD_veryflat to 16. This classification scheme, however, is not sufficient to differentiate edge from busy details, which usually also corresponds to large value of G_sum. In addition, it will be sensitive to noise if the classification of each pixel is independently performed. In this invention, we employ morphological operations to improve the accuracy and effectiveness of the classification.

As discussed above, in addition to true edges, busy details and noise tend to lead to large value of G_sum, too. However, for the busy and details area, the pixels that have large G_sum usually have a random distribution. On the other hand, for the edge area, pixels that have large G_sum usually have a particular pattern. For example, for the area with horizontal edges, pixels along the edge all should have large G_sum. This motivates us to use orientation-based erosion techniques to differentiate true edges from busy texture areas and noisy areas.

Note that the erosion process for edge pixels is performed in the two blocks "Edge Erosion" and "Strong Edge Erosion" in FIG. 5. Since these two blocks are exactly the same, we will only discuss "Edge Erosion". As shown in FIG. 5, the input to "Edge Erosion" is the signal Pix_edge1 and the output is signal Pix_edge. Let edge_blk5×5 be the 2-dimensional array for the signals Pix_edge1 of the 25 pixels in each 5×5 window, in which the center pixel is the one being processed.

For example, to perform this calculation, e00_conct, e01_conct, e02_conct, e10_conct, e12_conct, e20_conct, e21_conct, and e22_conct may correspond to one of the eight connectivity cases (see FIG. 6) that correspond to the four edge orientations, horizontal, vertical, 45 degree, and negative 45 degree.

Each edge orientation has two associated edge connectivity cases. This is because the kernel used to calculate Pix_edge is a 3×3 operator, which leads to 3-pixel-wide outputs of Pix_edge along the edge. Thus, for example for the case of horizontal edge, if the edge is between the second and the third line in the 5×5 window, the distribution of Pix_edge1 will be the case of e01_conct. If the edge is between the third and the fourth line, then the distribution of Pix_edge1 will be the case of e21_conct. A true edge is detected (thus the output Pix_edge is 1) only when one of the eight connectivity cases is true and the value of Pix_edge1 of the center pixel is also 1, as given below.

--- e00_conct =
edge_blk5×5[1][1]&(edge_blk5×5[0][0]|edge_blk5×5[0][1]|edge_blk5×5[0][2]|edge_blk5×5[1][0]|edge_blk5×5[2][0]);
e01_conct = edge_blk5×5[1][2]&(edge_blk5×5[0][1]|edge_blk5×5[0][2]|edge_blk5×5[0][3]);
e02_conct =
edge_blk5×5[1][3]&(edge_blk5×5[0][2]|edge_blk5×5[0][3]|edge_blk5×5[0][4]|edge_blk5×5[1][4]|edge_blk5×5[2][4]);
e10_conct = edge_blk5×5[2][1]&(edge_blk5×5[1][0]|edge_blk5×5[2][0]|edge_blk5×5[3][1]);
e12_conct = edge_blk5×5[2][3]&(edge_blk5×5[1][4]|edge_blk5×5[2][4]|edge_blk5×5[3][4]);
e20_conct =
edge_blk5×5[3][1]&(edge_blk5×5[4][0]|edge_blk5×5[4][1]|edge_blk5×5[4][2]|edge_blk5×5[3][0]|edge_blk5×5[2][0]);
e21_conct = edge_blk5×5[3][2]&(edge_blk5×5[4][1]|edge_blk5×5[4][2]|edge_blk5×5[4][3]);
e22_conct =
edge_blk5×5[3][3]&(edge_blk5×5[4][2]|edge_blk5×5[4][3]|edge_blk5×5[4][4]|edge_blk5×5[3][4]|edge_blk5×5[2][4]);
Pix_edge[j][i] = edge_blk5×5[2][2]&
(e00_conct|e01_conct|e02_conct|e10_conct|e12_conct|e20_conct|e21_conct|e22_conct);

---

Figure 6:
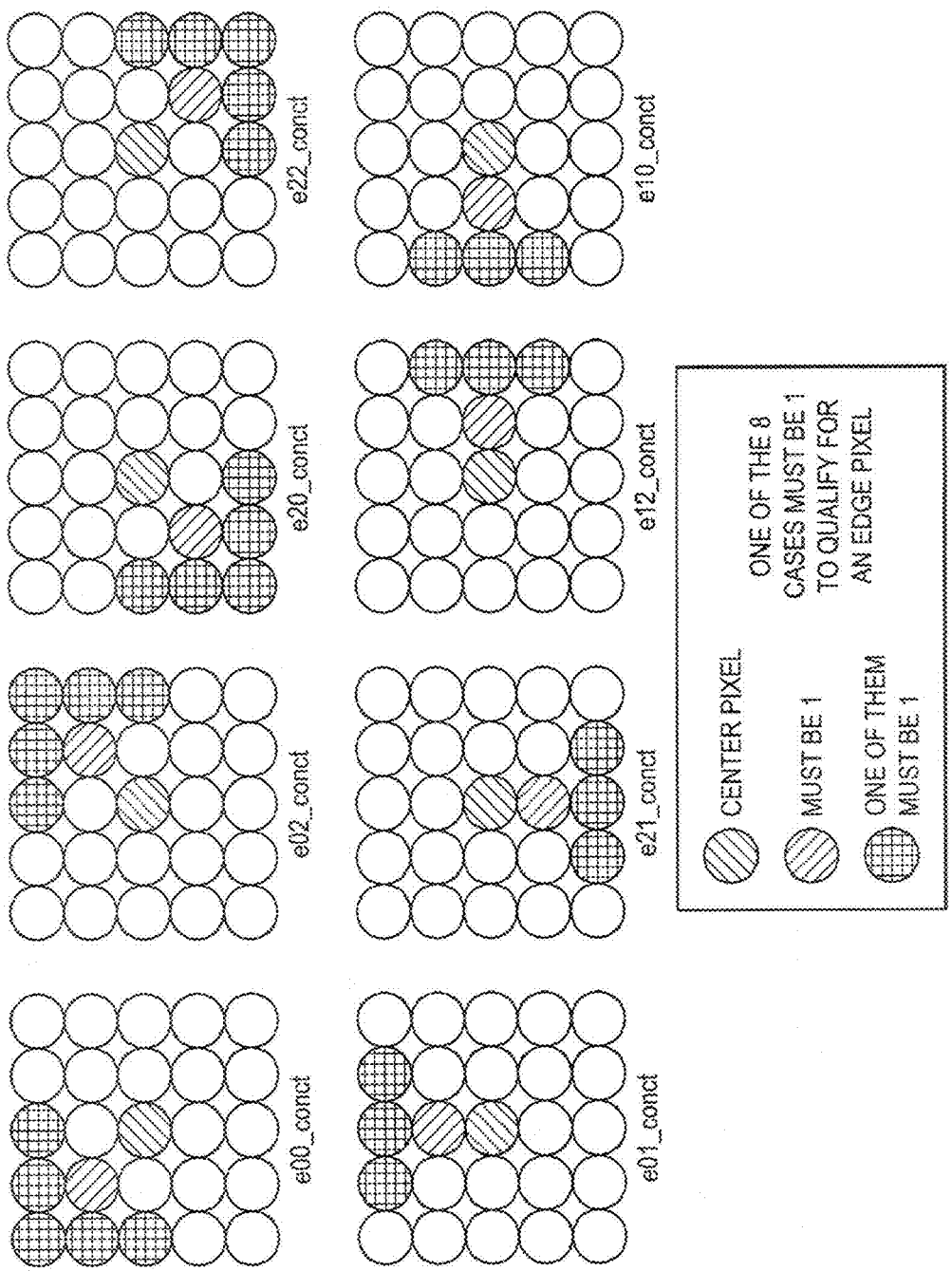
FIG. 6 illustrates an embodiment of edge pixel erosion.

The eight connectivity cases are depicted in graph as shown in FIG. 6. It clearly illustrates the idea of the edge erosion. After this process, less pixels will be indicated as edge or strong edge, as busy texture and noisy area, which also have large value of G_sum, will be eroded by this erosion process. As the result, only true edges will be left after the erosion process.

The outputs of edge erosion blocks are Pix_edge and Pix_strongedge, which indicate the true edge and strong edge per pixel, respectively. The next step is to determine the true edge per 8×8 block, edge_blck. The calculation is given below $$\text{num\_strongedge} = \sum_{i=0}^{7}\sum_{j=0}^{7} \text{Pix\_strongedge}[j][i] \quad (3.4)$$

-continued $$num\_edge = \sum_{i=0}^{7}\sum_{j=0}^{7} Pix\_edge[j][i]$$

$$num\_veryflatpix\_blck = \sum_{i=0}^{7}\sum_{j=0}^{7} Pix\_veryflat[j][i]$$

$$num\_strongedge = \sum_{i=0}^{7}\sum_{j=0}^{7} Pix\_strongedge[j][i]$$

$$num\_edge = \sum_{i=0}^{7}\sum_{j=0}^{7} Pix\_edge[j][i]$$

$$edge\_blck = \begin{cases} 1 & \text{if } num\_strongedge \geq Thr\_num\_strongedge \\ & \|num\_edge \geq Thr\_num\_edge \\ 0 & \text{otherwise} \\ 2 & \text{if } num\_strongedge \geq Thr\_num\_strongedge \\ 0 & \text{otherwise} \end{cases}$$

This step is pretty straightforward. That is, if the sum of Pix_strongedge in one block is greater than a predefined threshold, Thr_num_strongedge, or if the sum of Pix_edge is greater than a predefined threshold, Thr_num_edge, then this block is identified as a block with edge, i.e., edge_blck is set as 1. Otherwise, we can say this block does not have an edge, i.e., edge_blck is set as 0. In the simulations, good results were obtained when we set Thr_num_strongedge be 3 and Thr_num_edge be 3.

In the block of "Determine edge strength per block", we calculate the edge strength per 8×8 block, which is the maximum of a shifted version of G_sum in the 8×8 block, as given by $$edge\_strength\_blck = \max_{0 \leq i \leq 7, 0 \leq j \leq 7} \{G\_sum[i][j] >> 4\} \quad (3.5)$$

This value will be used to determine the thresholds used in the sigma filter.

As we discussed above, due to motion compensation used in video compression, ringing artifacts occurred in one block may be propagated to the other blocks in the same MB. Thus, we need to determine whether there exists an edge or a strong edge within one MB. This is achieved through dilation of the edge identification of each block, edge_blck. MB is usually referred to as 16×16 block. In this embodiment, the dilation in an 8×16 block in considered, rather than 16×16 block, Thus, MB in this invention is referred to an 8×16 block. Then, $$edge\_MB[k] = edge\_blck[k] + \max \quad (3.6)$$
$$\begin{cases} edge\_blck[1] * (num\_veryflatpix\_blck \leq Thr\_num\_flatpix), \\ edge\_blck[2] * (num\_veryflatpix\_blck \leq Thr\_num\_flatpix) \end{cases}$$
$$k = 1, 2$$

where edge_blck[1] and edge_blck[2] are the two edge_blck's of the two 8×8 blocks in one 8×16 MB, edge_MB[1] and edge_MB[2] are the two edge_MB's of the two 8×8 blocks in one MB after the dilation, num_veryflatpix_blck is given in (3.3), and Thr_num_faltpix is a predefined threshold. In one embodiment, Thr_num_faltpix is set to 20.

Similar to the dilation of edge_blck, dilation is employed in this block, too. The edge strength per MB is the maximum of the two edge_strength_blck's of the two blocks in one MB, as given below $$edge\_strength\_MB = \max\{edge\_strength\_blck[1], edge\_strength\_blck[2]\} \quad (3.7)$$

where edge_strength_blck[1] and edge_strength_blck[2] are the two edge_strength_blck's of the two blocks in one 8×16 MB.

Figure 7:
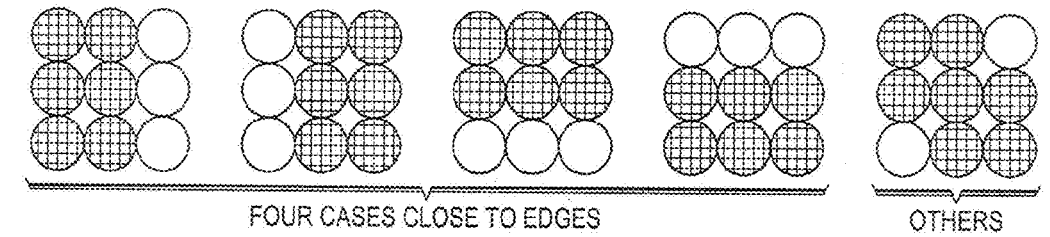
FIG. 7 illustrates an embodiment of flat pixel erosion.

Similar to the edge erosion, the flat area identifications need the erosion process too, in order to be noise robust and accurately detect flat area. In this invention, one pixel is identified as flat, i.e., Pix_flat=1, only when the equation below is met $$Pix\_flat = \left(\sum_{j=1}^{2}\sum_{i=0}^{2} Pix\_flat1[j][i]\right) == 6 \quad (3.8)$$

$$\left\|\left(\sum_{j=0}^{1}\sum_{i=0}^{2} Pix\_flat1[j][i]\right) == 6\right\|$$

$$\left(\sum_{j=0}^{2}\sum_{i=1}^{2} Pix\_flat1[j][i]\right) == 6$$

$$\left\|\left(\sum_{j=0}^{2}\sum_{i=0}^{1} Pix\_flat1[j][i]\right) == 6\right\|,$$

$$\left(\sum_{j=0}^{2}\sum_{i=0}^{2} Pix\_flat1[j][i]\right) \geq 7$$

where Pix_flat1[j][i], $0 \leq j \leq 2$, $0 \leq i \leq 2$, are for the pixels in the 3×3 window with the pixel being processed sitting at the center. This process can be depicted in FIG. 7, where the blue pixels denote the pixels whose value of Pix_flat1 must be 1. The first four cases correspond to the first conditions in (3.8) and the last one represents the other cases where there are at least seven pixels whose value of Pix_flat1 must be 1. The erosion process for processing Pix_veryflat1 is the exactly the same as that for Pix_flat1.

Figure 8:
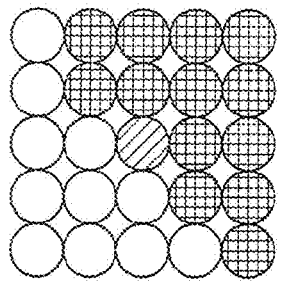
FIG. 8 illustrates an embodiment of an advantage of the sigma filter.

As mentioned above, bilateral filter (also called sigma filter) is used to perform low-pass filtering to remove ringing artifacts in this invention. In the implementation, a 5×5 two-step bilateral, which is also called sigma filter, is used. This filter is given by $$Y_{sigma} = \frac{\sum_{j=0}^{4}\sum_{i=0}^{4} w[j][i]Y[j][i]}{\sum_{j=0}^{4}\sum_{i=0}^{4} w[j][i]} \quad (3.9)$$

$$w[j][i] = \begin{cases} 0 & \text{if } |Y[j][i] - Yc| > Thr\_sigma2 \\ 1 & \text{if } Thr\_sigma1 < |Y[j][i] - Yc| \leq Thr\_sigma2 \\ 2 & \text{if } |Y[j][i] - Yc| \leq Thr\_sigma1 \end{cases}$$

where Yc=Y[2][2] is the value of the center pixel in the 5×5 window, w[j][i] are the weights for each pixel, and Thr- _sigma1 and Thr_sigma2 are the two thresholds. To illustrate the advantage of the Sigma filter, we can look at FIG. 8, where the blue pixels' values are close to the center green pixel, while the white pixels' values are relatively far away from the center pixel.

In this case, it is obvious that there is a negative 45 degree edge along the center pixel. When the sigma filter is applied to the center pixel, the weights w[j][i] for those blue pixels will be 1 or 2 (depending how close these values with respect to the center pixel), while the weights for the white pixels will be 0, because the differences of those white pixels with respect to the center are large. Then according to (3.9), the output of the Sigma filter $Y_{sigma}$ will be kind of the average of those blue pixels (including the center pixel itself). By doing so, noise will be reduced while the edge will be essentially maintained.

The performance of the Sigma filter heavily depends on how the two thresholds Thr_sigma1 and Thr_sigma2 are chosen. It is clear that smaller thresholds lead to less effectiveness of noise removal, but larger thresholds tend to remove the details or smooth the edges when removing noise.

In this invention, those two thresholds are determined as below $$\text{Thr\_sigma1}=drn\_\max\_sigma\_thr1 \quad (3.10)$$

$$\text{Thr\_sigma2}=\text{Thr\_sigma1}<<1 \quad (3.11)$$

where drn_max_sigma_thr1 is a predefined threshold which serves as the upper bound of Thr_sigma1, and Thr_sigma2 is defined as twice of Thr_sigma1. It is preferred to adapt this parameter to the noise level of a picture to achieve the best noise reduction performance, if noise measurement can be done in the system. Otherwise, this parameter has to be set as a constant. In our simulations, we found setting drn_max_sigma_thr1 to 8 generates good results, for 8-bit data.

At the last step of this invention, the sigma filter output is mixed with the original pixel value to generate the final output. The blending factor is determined. Gradient calculated maybe used to determine the blending factor, where we scale the previously calculated gradient G_sum to G_sum sigma, which represents the local edge strength for the pixel being processed. The scale factor is calculated, which is used for scaling the blending coefficient used in the soft switch. drn_bld_scale_strgedge and drn_bld_scale_weakedge are two predefined threshold corresponding to strong and weak edge, respectively. In a practical system design, soft switch is usually preferred since it reduces flickers introduced by a hard switch. At the last step of this invention, the sigma filter output is mixed with the original pixel value to generate the final output. The blending factor is determined by the logic shown as below.

Once drn_bld_scale_strgedge >=drn_bld_scale_weakedge, the blending coefficient is calculated, where drn_bld_coeff_block_edge, drn_bld_coeff_QP, and drn_bld_coeff_local_edge are three predefined constants representing the blending factor corresponding to the edge strength of the block, the effect due to quantization parameter Q, and the local edge strength. This coefficient is then scalled by the previously calculated scaling factor, bld_scale, and then cliped to [0, drn_max_bld_factor], as shown from line 20 to 27. At the end, soft-switch is achieved through blending the original pixel value and the filtered pixel value based on the blending factor obtained above. The greater value of the blending coefficient, the final output will be closer to the filtered output.

Sigma filter output is selected only when there is a edge in the MB (edge_MB>=1), the pixel being processed is not an edge pixel (Pix_edge==0), the pixel being processed is relatively flat (Pix_flat==1), and there are not many very flat pixels in this block (num_veryflatpix_blck<=drn_Thr_num_flatpix_blck). Increasing quantization parameter, Q, increases the blending coefficient, since large quantization parameter means coarser quantization and more high frequency DCT coefficients removal, which may lead to more severe ringing artifacts. Usually, if the MPEG information of Q per MB is available in performing de-ringing, better performance can be achieved. If such information is not available, Q can be set as a constant, e.g., 24, or the average Q per frame if it is available.

Figure 10:
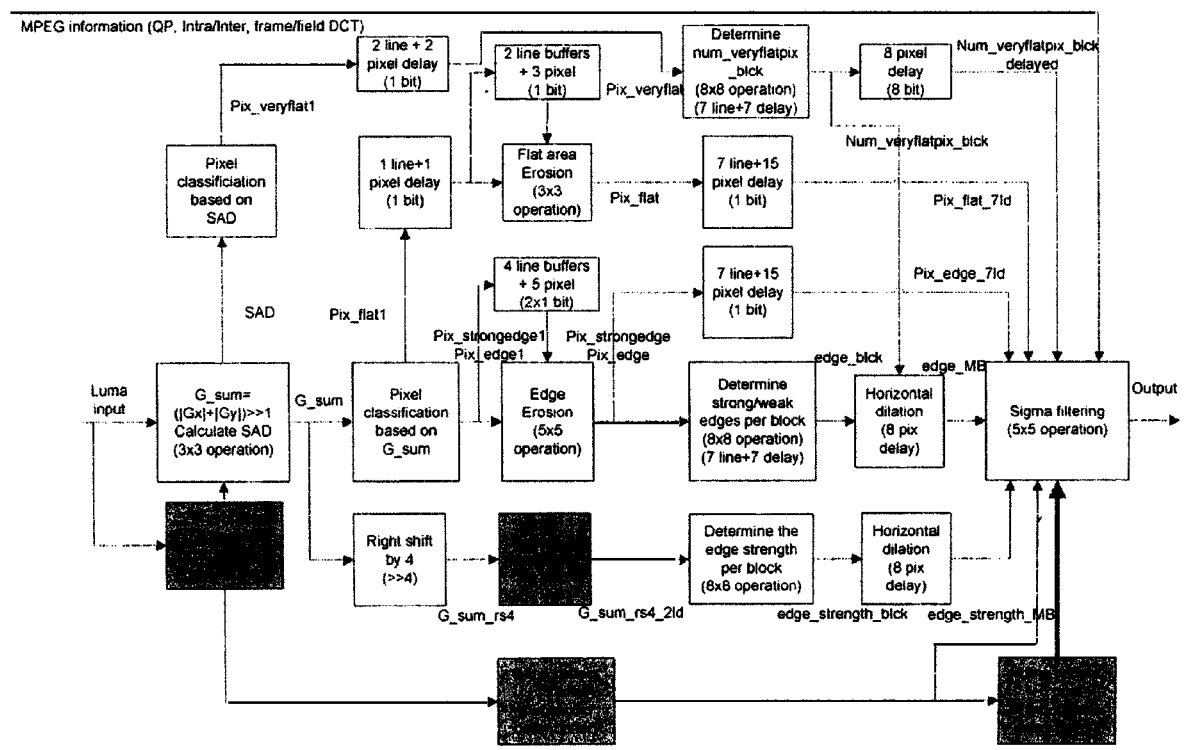
FIG. 10 illustrates an embodiment of a hardware implementation of a ringing reduction apparatus.

In one embodiment, as shown in FIG. 10, the line buffers are added, which are used to match the delays of different path or needed for a window processing (for example, a 3×3 window operation such as the Sobel operations in the calculation of gradients require 2 line buffers implementation). In the implementation, the horizontal dilations of edge_blck and edge_strength_blck can be bypassed if the coding mode for the MB is intra mode.

Due to novel morphologic processing used in edge detection, the invention reduces the ringing artifacts introduced due to compression while preserving the details and edges of images at the same time. Embodiment of this invention may be implemented as a pure post-processing system without using any MPEG coding parameter. While some MPEG coding parameters, such as the quantization parameter for each MB is available, the system performance may be enhanced. Hence, in one embodiment, a novel morphologic scheme differentiates edges from busy textures and then a low-pass filtering is applied to the pixels that are affected with ringing artifacts.

Figure 9:
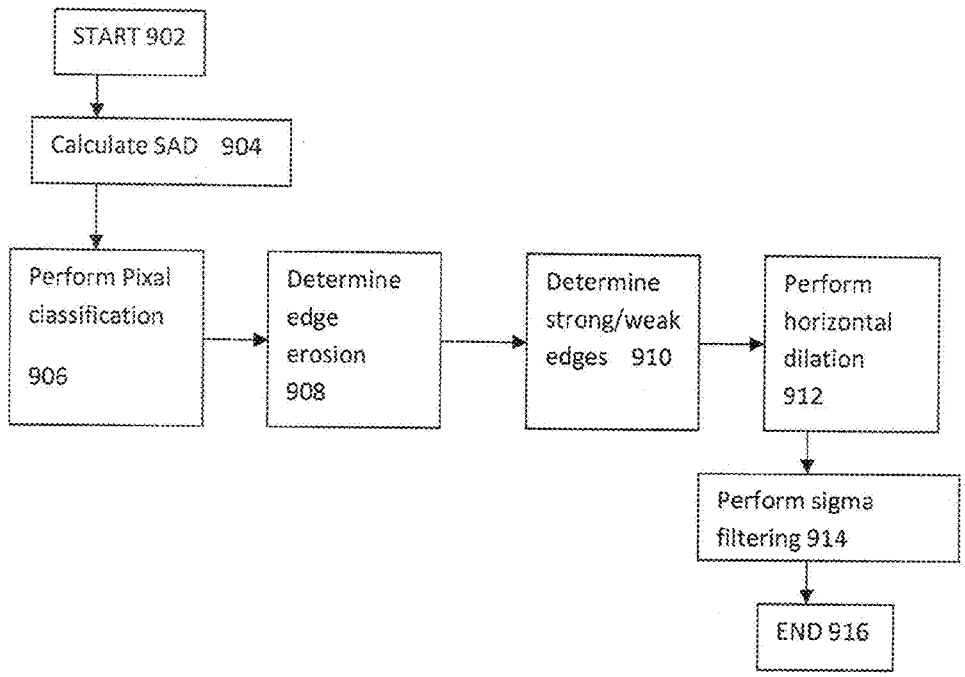
FIG. 9 illustrates an embodiment of a flow diagram for ringing reduction method.

FIG. 9 illustrates an embodiment of a flow diagram for ringing reduction method. The method starts at step 902 and continues to step 904. AT step 904, the method 900 calculates on sum of absolute difference (SAD). At step 904, the method 900 classifies the pixel based on SAD. At step 906, the method 900 performs edge erosion. At step 908, the method 900 determines the strength and/or weakness of the edges per block. At step 910, the method 900 performs horizontal dilation. At step 912, the method 900 performs sigma filtering. The method 900 ends at step 914.

While the foregoing is directed to embodiments of the present invention, other and further embodiments of the invention may be devised without departing from the basic scope thereof, and the scope thereof is determined by the claims that follow.

What is claimed is:

1. A method of a digital signal processor for ringing artifacts reduction for compressed video signals, comprising:
   receiving luma data to the digital signal processor;
   calculating sum of gradient of the luma data;
   calculating sum of absolute difference (SAD) of the luma data;
   performing pixel classification based of the calculated SAD and sum of gradient;
   performing erosion on a detected edge pixel indicator on a detected flat pixel indicators;
   determining at least one of the strength or weakness of an edge based on the determined edge erosion;
   performing horizontal dilation based on the detected edge pixel indicators and edge strength; and
   performing at least one of sigma or bilateral filtering to the luma data according to the detected edge pixel indicator, flat pixel indicator, edge strength, or the number of very flat pixel in the block.

2. The method of claim 1, wherein the pixel classification is based on sum of gradient.

3. The method of claim 2 further comprising calculating the sum of gradient.

4. An apparatus for ringing artifacts reduction for compressed video signals, comprising:
   means for receiving luma data to the digital signal processor;
   means for calculating the sum of gradients of the luma data;
   means for calculating sum of absolute difference (SAD) of the luma data;
   means for performing pixel classification based of the calculated sum of gradients and SAD;
   means for performing erosion on the detected edge pixel indicators to make the edge pixel detection more robust to noise and thus more accurate;
   means for performing erosion on the detected flat pixel indicators to make the flat pixel detection more robust to noise and thus more accurate;
   means for determining at least one of the strength or weakness of an edge based on the determined edge erosion;
   means for performing horizontal dilation based on detected edge pixel indicators and edge strength; and
   performing at least one of sigma or bilateral filtering to the luma data according to the detected edge pixel indicator, flat pixel indicator, edge strength, or the number of very flat pixel in the block.

5. The method of claim 4, wherein the pixel classification is based on sum of gradient and SAD.

6. The method of claim 5 further comprising means for calculating the sum of gradient and SAD.

7. A computer readable medium comprising software that, when executed by a processor, causes the processor to perform a method for ringing artifacts reduction for compressed video signals, the method comprising
   receiving luma data to the digital signal processor;
   calculating sum of gradient of the luma data;
   calculating sum of absolute difference (SAD) of the luma data;
   performing pixel classification based of the calculated SAD and sum of gradient;
   performing erosion on a detected edge pixel indicator on a detected flat pixel indicators;
   determining at least one of the strength or weakness of an edge based on the determined edge erosion;
   performing horizontal dilation based on the detected edge pixel indicators and edge strength; and
   performing at least one of sigma or bilateral filtering to the luma data according to the detected edge pixel indicator, flat pixel indicator, edge strength, or the number of very flat pixel in the block.

8. The method of claim 7, wherein the pixel classification is based on sum of gradient and SAD.

9. The method of claim 8 further comprising calculating the sum of gradient and SAD.

* * * * *